A. KIPNISS & M. P. NEUMANN.
MACHINE FOR MAKING BOBBINS FOR ELECTRIC BATTERIES.
APPLICATION FILED OCT. 4, 1916.

1,211,176.  Patented Jan. 2, 1917.

Inventors,
Abraham Kipniss
Max Paul Neumann
By their Attorney
Donn Twitchell

A. KIPNISS & M. P. NEUMANN.
MACHINE FOR MAKING BOBBINS FOR ELECTRIC BATTERIES.
APPLICATION FILED OCT. 4, 1916.
1,211,176.
Patented Jan. 2, 1917.
3 SHEETS—SHEET 2.
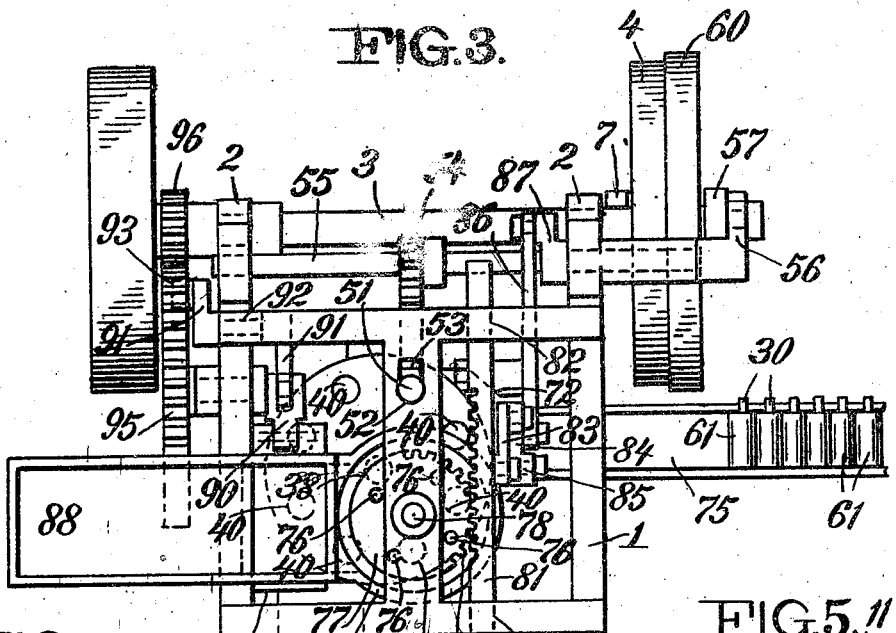
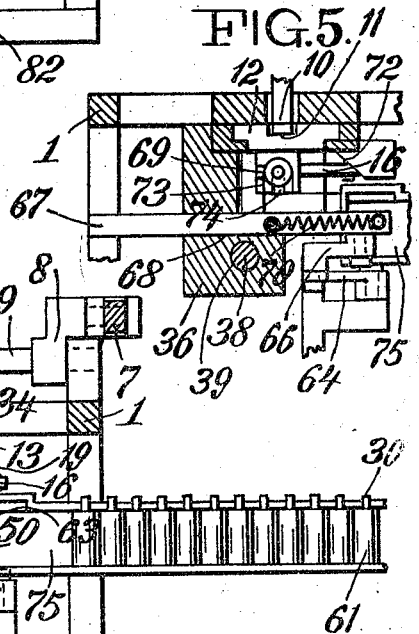
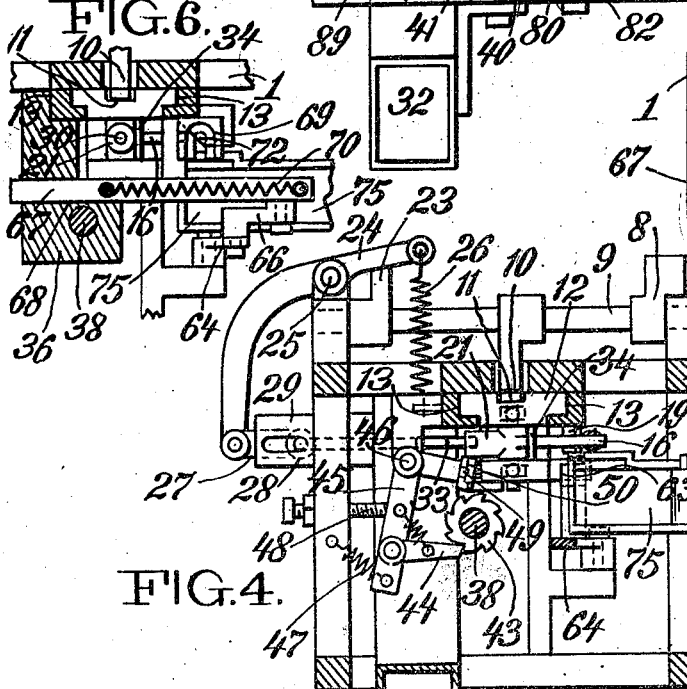
Inventors
Abraham Kipniss
Max Paul Neumann
By their Attorney
Donn. Twitchell A. KIPNISS & M. P. NEUMANN.
MACHINE FOR MAKING BOBBINS FOR ELECTRIC BATTERIES.
APPLICATION FILED OCT. 4, 1916.
1,211,176.
Patented Jan. 2, 1917.
3 SHEETS—SHEET 3.
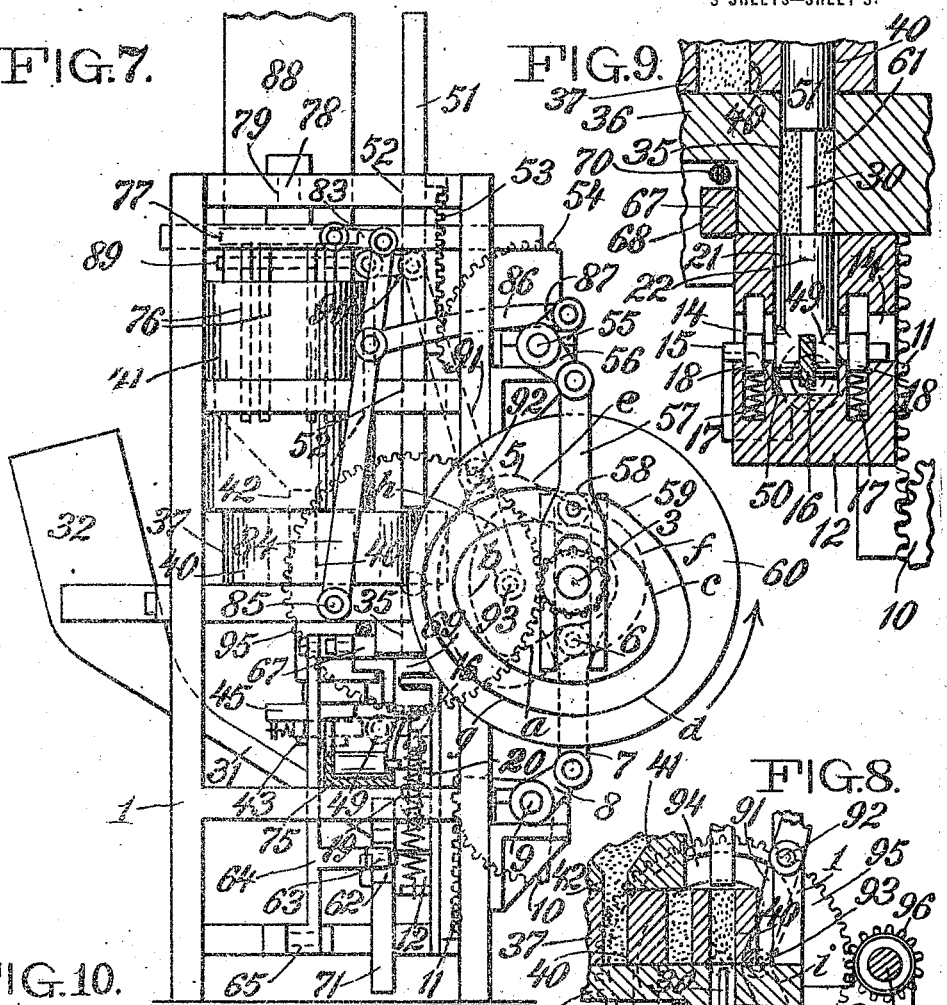
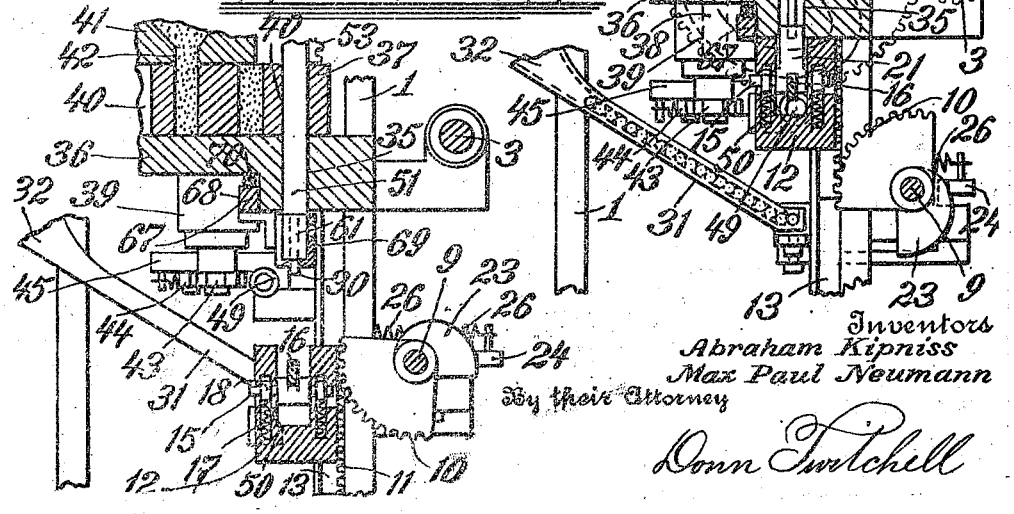
Inventors
Abraham Kipniss
Max Paul Neumann
By their Attorney
Donn Twitchell

UNITED STATES PATENT OFFICE.

ABRAHAM KIPNISS AND MAX PAUL NEUMANN, OF NEW YORK, N. Y.

MACHINE FOR MAKING BOBBINS FOR ELECTRIC BATTERIES.

1,211,176.

Specification of Letters Patent.   Patented Jan. 2, 1917.

Application filed October 4, 1916.  Serial No. 123,741.

*To all whom it may concern:*

Be it known that we, ABRAHAM KIPNISS, a citizen of the United States, and a resident of the city of New York, in the county of Kings and State of New York, and MAX PAUL NEUMANN, a citizen of the United States, and a resident of the city of New York, in the county of Queens and State of New York, have invented a certain new and useful Machine for Making Bobbins for Electric Batteries, of which the following is a specification.

This invention relates to a machine for shaping carbon to special forms, known as "bobbins," which are used in electric batteries.

The object is to provide means whereby the bobbins may be produced by means of automatic mechanism in such a manner that they will be uniformly well made.

The invention consists of a cylindrical compressing chamber; means for moving a stick of previously pressed carbon to rest therein; means for forcing a measured quantity of graphite into said chamber and around said carbon stick; and means whereby the graphite thus pressed to conform to the shape of the chamber and having a portion of the carbon stick protruding beyond the pressed graphite, will be forced out of the compressing chamber and finally delivered to an inclined receiving chute down which the bobbins thus formed may roll.

Figure 1:
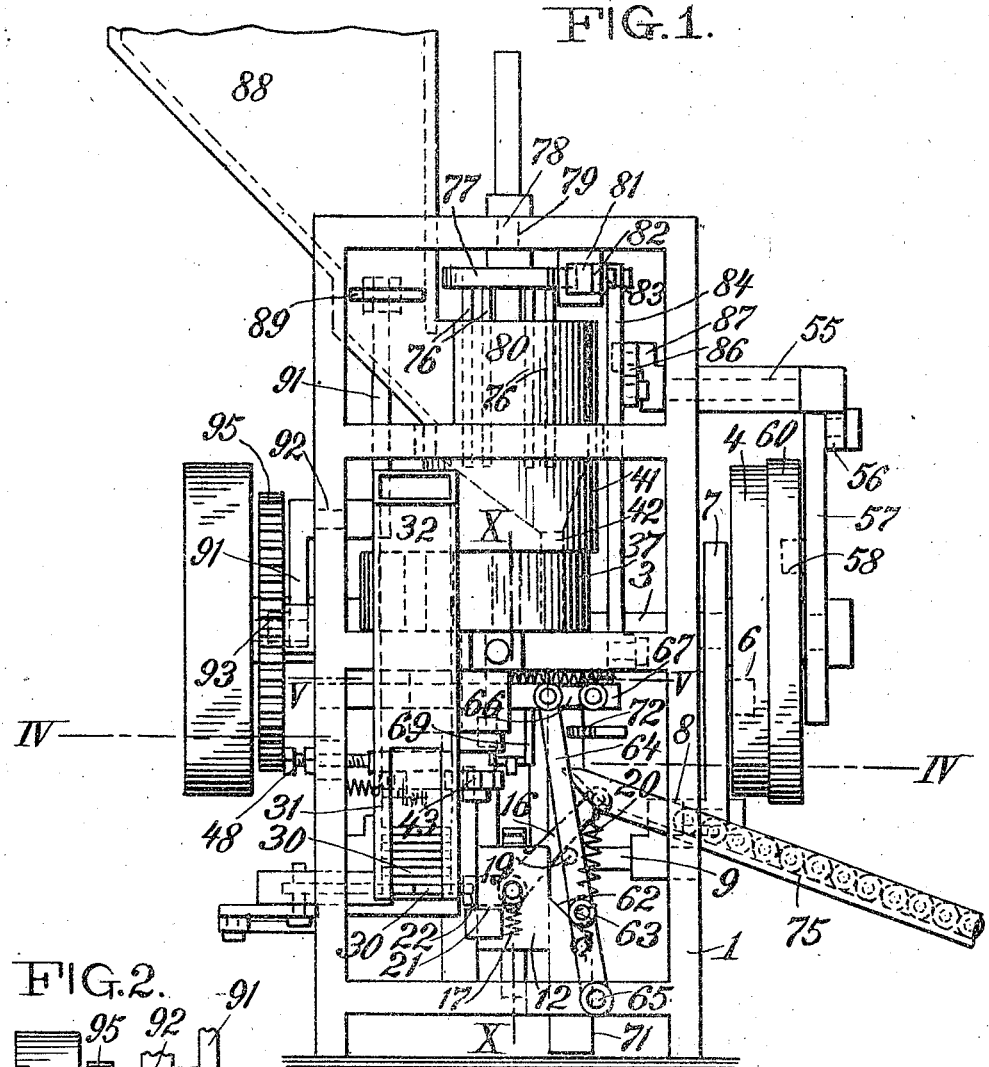
Figure 2:
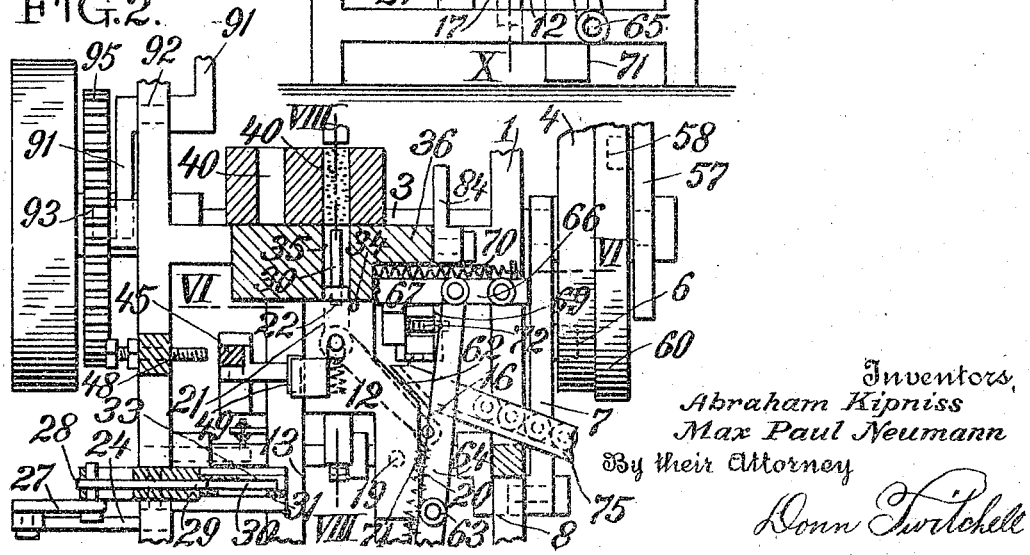

In the accompanying drawing: Figure 1 is a front elevation of the machine. Fig. 2 is a sectional elevation, showing the means for moving the previously pressed carbon stick in a different position from that shown in Fig. 1. Fig. 3 is a plan view of the machine. Fig. 4 is a horizontal section on the line IV—IV of Fig. 1. Fig. 5 is a horizontal section approximately on the line V—V of Fig. 1. Fig. 6 is a horizontal section approximately on the line VI—VI of Fig. 2. Fig. 7 is a side elevation of the machine, the inclined receiving chute being shown in section. Fig. 8 is a transverse section on the line VIII—VIII of Fig. 2. Fig. 9 is an enlarged view of certain parts shown in Fig. 8, showing their position when the operation of pressing the graphite in the compressing chamber is completed. Fig. 10 is a transverse section on the line X—X of Fig. 1, showing the position of parts when the pressed graphite and carbon stick are forced out of the compressing chamber.

The main frame 1 of the machine is provided with bearings 2 in which a driving shaft 3 is journaled. Secured to shaft 3 is a cam 4 having a groove 5 in which a roller 6 travels. Roller 6 is journaled on a bar 7, one end of which is slotted so that it can ride on the shaft 3. The other end of bar 7 is connected to an arm 8 secured to a shaft 9 which is journaled in suitable bearings on the main frame. Secured to shaft 9 is a gear segment 10 which is in mesh with a rack 11 forming part of a slide 12 having vertical movement in guides 13. Mounted in vertical slots 14 formed in slide 12 is a shaft 15 to which a lever 16 is secured. Springs 17 mounted in the slide and bearing against collars 18 loosely mounted on shaft 15 cause the shaft to be normally held in the upper ends of the slots. Lever 16 is held against a stationary pin 19 by means of a spring 20. Forming part of lever 16 is a plunger arm 21 having a recess 22 formed in its outer end. When the slide 12 occupies the down position shown in Fig. 1, action of pin 19 on lever 16 causes arm 21 of the lever to stand horizontal.

Secured to shaft 9 is a cam 23 which acts upon an arm of a lever 24 which is pivoted at 25, the lever being held against the cam by means of a spring 26. The other arm of lever 24 is connected by a link 27 to a slide 28 having reciprocating movement in horizontal guides. Forming part of slide 28 is a plunger 29 which serves to move the lowermost of a series of previously pressed carbon sticks 30 from a passage 31 forming part of a magazine 32. As shown in Fig. 1, one end of this carbon stick is moved into the recess 22 of plunger arm 21.

By means of part *a* of cam groove 5, a rocking movement is imparted to shaft 9 whereby slides 12 and 28 are moved from the position shown in Fig. 1 to the position shown in Fig. 2. Plunger 29 of slide 28 will then be behind another carbon stick 30 in passage 31. During upward movement of slide 12, spring 20 acting on lever 16 causes swinging movement of the lever, thereby causing the plunger arm 21 to move the carbon stick 30 seated in recess 22 upward, an opening 33 being formed in passage 31 to permit this movement. When swinging movement of lever 16 causes plunger 21 to be moved to rest against a stop 34, the plunger arm and carbon stick 30, will be standing vertical, and as upward movement of the slide continues, the carbon stick and a portion of the plunger arm will be moved up into a cylindrical chamber 35 which is formed in a horizontal bed 36. By reference to Fig. 2 it will be seen that the carbon stick is smaller in diameter than the chamber 35 and extends nearly to the upper end thereof, while the plunger arm 21 is equal to the diameter of the chamber and extends a short distance into the lower end thereof.

Resting on the horizontal bed 36 is a turn-table 37 having a downwardly extending shaft 38 which is free to rotate in a bearing 39. Turn-table 37 is provided with a series of cylindrical receptacles 40, which are open top and bottom. Located above the turn-table 37 is a stationary hopper 41 having an opening 42 through its bottom, which opening is arranged to register with one of the receptacles 40, so that powdered graphite that may be placed in the hopper will flow into the receptacle. To the lower end of shaft 38 is secured a ratchet wheel 43 having teeth equal in number to the receptacles 40 that are formed in the turn-table 37. Adapted for engagement with the teeth of ratchet wheel 43 is a spring pressed pawl 44 pivoted upon one arm of a bell-crank lever 45, which is pivoted at 46. By means of a spring 47, the bell-crank lever is held against an adjustable stop 48. On the other arm of the bell-crank lever is journaled a roller 49, against which an incline 50 on slide 12 bears when the slide nears the end of its upward movement, thereby causing the bell-crank lever to be actuated, whereby movement is imparted to the turn-table 37 sufficient to move another receptacle 40 to register with the opening 42 of the hopper 41. Successive movements of the turn-table 37 cause one of the receptacles 40, that is filled with powdered graphite, to be moved to rest in range with the cylindrical chamber 35 in which the plunger arm 21 has served to place a previously pressed carbon stick 30.

Located above the turn-table 37 and in range with the chamber 35 and the filled receptacle 40 above it, is a plunger 51 which has reciprocating movement in vertical guides 52. Plunger 51 is provided with a rack 53 in mesh with a gear segment 54 which is secured to a rock-shaft 55 journaled in suitable bearings on the main frame. Secured to rock-shaft 55 is an arm 56 which is connected to one end of a bar 57, the other end of the bar being slotted so that it will ride on shaft 3. Journaled on bar 57 is a roller 58 which travels in a cam groove 59 formed in a cam wheel 60 which is secured to the shaft 3.

After part $a$ of cam groove 5 has caused the slide 12 and turn-table 37 to be moved to the position shown in Fig. 8, and while part $b$ causes the slide to remain stationary, part $c$ of cam groove 59, by action on roller 58, bar 57, arm 56, rock-shaft 55, gear segment 54 and rack 53 of plunger 51 will cause downward movement of the plunger. Plunger 51 has the same diameter as the receptacle 40, the chamber 35 and the plunger arm 21, so that as the plunger moves downward, the powdered graphite will thereby be forced from the receptacle 40 into the chamber 35, around the carbon stick 30 and against the upper end of the plunger arm 21. The graphite will accordingly be compressed to conform to the cylindrical shape of chamber 35, and caused to adhere to the carbon stick 30. Owing to the action of springs 17, the plunger arm 21 will serve to compress the portion of the graphite next to the plunger arm until the degree of compression caused by plunger 51 is sufficient to overcome the force of the springs 17 thereby causing downward movement of arm 21 until shaft 15 reaches the end of slots 14, after which time the plunger arm 21, carbon stick 30 and compressed graphite 61 will be moved to the position shown in Fig. 9.

While part $d$ of cam groove 59 causes plunger 51 to remain stationary, part $c$ of cam groove 5 causes slide 12 to be moved to the down position. During downward movement of the slide 12, an incline 62 thereon engaging a roller 63 journaled on a lever 64, which is pivoted at 65, permits movement of the lever. Lever 64 is connected by a link 66 to a slide 67 which has reciprocating movement in horizontal guides 68. Forming part of slide 67 is a receptacle 69. By means of a spring 70 connected to slide 67, the slide, the link 66, and lever 64 are moved so that roller 63 on the lever is forced against a straight surface 71 forming part of slide 12, as shown in Fig. 2. During the first part of the downward movement of slide 12, plunger arm 21 will be moved down away from the carbon stick and the pressed carbon 61 which will then be held up by adherence to the wall of compressing chamber 35. During this movement of the slide, the straight surface 71 acting on roller 63 will cause lever 64 and slide 67 to remain stationary. During the last part of the downward movement of slide 12, action of pin 19 on lever 16 causes plunger arm 21 to swing to the horizontal position, and action of incline 62 on roller 63 causes movement of the lever 64 and slide 67 from the position shown in Fig. 2 to the position shown in Fig. 1. The receptacle 69 on slide 67 will then be below the carbon stick and pressed carbon in the compressing chamber 35.

During part of the time part $f$ of cam groove 5 causes slide 12 to remain stationary. Part $g$ of cam groove 59 causes plunger 51 to be moved farther downward, thereby causing the carbon stick and pressed graphite to be moved out of the compressing chamber 35 and into the receptacle 69, forming part of slide 67, as shown in Fig. 10. Part $h$ of cam groove 59 causes plunger 51 to be moved to the up position. Part $a$ of cam groove 5 will then cause slide 12 to be moved to the up position, whereby plunger arm 21 moves another carbon stick into the compressing chamber, and the slide 67 will move the receptacle 69 to the position shown in Figs. 2 and 6, during which movement the carbon stick and pressed graphite or bobbin as it may now be called, will be forced against a fixed incline 72, whereby the bobbin will be forced through side openings 73 and 74 of the receptacle, and caused to tumble onto an inclined chute 75, down which the bobbin may roll.

During the successive operations of the machine, in which powdered graphite is fed from magazine 41 to the measuring receptacles 40, the graphite, which must be limited in quantity owing to a tendency to pack, is constantly agitated by means of a series of rods 76 which extend downward from an oscillating disk 77 located above the magazine. Disk 77 is secured to a shaft 78 which is free to rotate in a bearing 79. Disk 77 is provided with segmental gear teeth 80 in mesh with a rack on a bar 81 which has reciprocating movement in horizontal guides 82. Bar 81 is connected by a link 83 to a lever 84 which is pivoted at 85. Lever 84 is connected by a link 86 to an arm 87 which is secured to the rock-shaft 55. It will be understood that movement of the rock-shaft 55 causes oscillating movement of disk 77 and consequent movement of the agitating rods 76 in the powdered graphite contained in the magazine 41.

In order to maintain a constant supply of the necessarily limited quantity of graphite in magazine 41, an auxiliary magazine 88 is provided. The outlet of this magazine is controlled by means of a reciprocating slide 89. Slide 89 is connected by a link 90 to one arm of a lever 91 which is pivoted at 92. The other arm of lever 91 is provided with a roller 93 which travels in a heart-shaped cam groove 94 formed in a large gear wheel 95. Gear wheel 95 is in mesh with a small gear wheel 96 which is secured to the driving shaft 3. After several operations of the machine, due to as many revolutions of shaft 3, the part $i$ of cam groove 94, acting on roller 93 of lever 91, causes movement of slide 89, thereby permitting powdered graphite to flow from magazine 88 into magazine 41, which has capacity only for the limited quantity of graphite previously referred to.

Having described our invention, what we claim is:

1. A machine of the character described comprising a compressing chamber; means for moving a stick of previously pressed carbon to rest therein; means for pressing a measured quantity of graphite into said chamber and around said carbon stick; means whereby a portion of the carbon stick is left protruding beyond the pressed graphite; and means whereby said pressed graphite and carbon stick may be forced out of said compressing chamber.

2. A machine of the character described comprising a cylindrical compressing chamber, a plunger having reciprocating movement in line with the longitudinal axis of said chamber, said plunger having a recess adapted to receive one end of a previously pressed carbon stick, the diameter of the carbon stick being less than that of said chamber; means whereby forward movement of said plunger causes the remaining portion of said carbon stick to be moved into said chamber, and causes the plunger to close one end of said chamber; means whereby powdered graphite may be forced into said chamber, around said portion of the carbon stick, and against said slide, whereby the graphite is pressed to conform to the shape of the chamber, and caused to adhere to said portion of the carbon stick; said plunger during return movement thereof being moved away from said pressed graphite and carbon stick; said end of said carbon stick being then left protruding beyond said pressed graphite, thereby forming a "bobbin"; and means whereby said bobbin may be removed from said chamber.

3. A machine of the character described comprising a compressing chamber; means for moving a stick of previously pressed carbon to rest therein; means for pressing a measured quantity of graphite into said chamber and around said carbon stick; means whereby a portion of the carbon stick is left protruding beyond the pressed graphite; and means whereby said pressed graphite and carbon stick may be forced out of said compressing chamber; a reciprocating slide having a receptacle to receive said bobbin; a fixed incline adapted to force said bobbin from said receptacle at the end of a forward movement of said slide; and an inclined receiving chute down which said bobbin may roll when discharged from said receptacle.

4. A machine of the character described, comprising a compressing chamber; a reciprocating slide having a plunger pivoted thereto, said plunger having a recess formed in the free end thereof; a magazine for previously pressed carbon sticks; mechanism adapted to move one end of one of said sticks into said recess of said plunger; means whereby forward movement of said slide causes said plunger and carbon stick to swing into alinement with the longitudinal axis of said chamber; further forward movement of said slide then causing the remaining portion of said carbon stick to be moved into said chamber and causing the plunger to close one end of said chamber; means whereby powdered graphite may be forced into said chamber, around said portion of the carbon stick, and against said slide, whereby the graphite is pressed to conform to the shape of the chamber, and caused to adhere to said portion of the carbon stick; said plunger during return movement of said slide being moved away from said pressed graphite and carbon stick, and said end of said carbon stick being then left protruding beyond said pressed graphite; and means whereby said pressed graphite and carbon stick may be removed from said chamber.

5. A machine of the character described, comprising a compressing chamber, a plunger having reciprocating movement in line with the longitudinal axis of said chamber, said plunger having a recess adapted to receive one end of a previously pressed carbon stick, the diameter of the carbon stick being less than that of said chamber; means whereby forward movement of said plunger causes the remaining portion of said carbon stick to be moved into said chamber, and causes the plunger to close one end of said chamber; a plunger located at the opposite end of said chamber and having reciprocating movement in line with the longitudinal axis thereof; a carrier adapted to move powdered graphite to rest between the second-named plunger and said chamber; forward movement of said plunger then causing said powdered graphite to be forced into said chamber, around said carbon stick, and against the end of the first-named plunger, whereby the graphite is pressed to conform to the shape of the chamber, and caused to adhere to said portion of the carbon stick; the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

6. A machine of the character described, comprising a compression chamber; a reciprocating slide having a plunger pivoted thereto, said plunger having a recess formed in the free end thereof; a magazine for previously pressed carbon sticks; mechanism adapted to move one end of one of said sticks into said recess of said plunger; means whereby forward movement of said slide causes said plunger and carbon stick to swing into alinement with the longitudinal axis of said chamber; further forward movement of said slide then causing the remaining portion of said carbon stick to be moved into said chamber, and causing the plunger to close one end of said chamber; a plunger located at the opposite end of said chamber and having reciprocating movement in line with the longitudinal axis thereof; a carrier adapted to move powdered graphite to rest between the second-named plunger and said chamber; forward movement of said second plunger then causing said powdered graphite to be forced into said chamber, around said carbon stick, and against the end of the first-named plunger, whereby the graphite is pressed to conform to the shape of the chamber, and caused to adhere to said portion of the carbon stick, the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

7. A machine of the character described, comprising a compressing chamber; a plunger having reciprocating movement in line with the longitudinal axis of said chamber, said plunger having a recess adapted to receive one end of a previously pressed carbon stick; means whereby forward movement of said plunger causes the plunger and the remaining portion of said carbon stick to be moved into said chamber, the diameter of the plunger being equal to that of the chamber, and the diameter of the stick being less than that of the plunger, said plunger being held in said chamber by means of yielding pressure; a plunger located at the opposite end of said chamber and having reciprocating movement in line with the horizontal axis thereof; a carrier adapted to move powdered graphite to rest between the second-named plunger and said chamber; forward movement of said second plunger then causing said powdered graphite to be forced into said chamber, around said carbon stick, and against the end of the first-named plunger, whereby the graphite is pressed to conform to the shape of the chamber, and caused to adhere to the carbon stick; the yielding pressure against the first-named plunger serving to press the graphite at the end of the chamber opposite that of the second plunger until the first-named plunger is forced out of said chamber by action of the second plunger; the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

8. A machine of the character described, comprising a compressing chamber; a reciprocating slide having a plunger pivoted thereto, said plunger having a recess formed in the free end thereof; a magazine for previously pressed carbon sticks; mechanism adapted to move one end of one of said sticks into said recess of said plunger; means whereby forward movement of said slide causes said plunger and carbon stick to swing into alinement with the longitudinal axis of said chamber; further forward movement of said slide then causing the plunger and the remaining portion of said carbon stick to be moved into said chamber, the diameter of the plunger being equal to that of the chamber, and the diameter of the stick being less than that of the plunger; said plunger being held in said chamber by means of yielding pressure; a plunger located at the opposite end of said chamber and having reciprocating movement in line with the longitudinal axis thereof; a carrier adapted to move powdered graphite to rest between the second-named plunger and said chamber, forward movement of said second plunger then causing said powdered graphite to be forced into said chamber, around said carbon stick and against the end of the first-named plunger, whereby the graphite is pressed to conform to the shape of the chamber, and caused to adhere to the carbon stick; the yielding pressure against the first-named plunger serving to press the graphite at the end of the chamber opposite that of the second plunger until the first-named plunger is forced out of said chamber by action of the second plunger; the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

9. A machine of the character described, comprising a compressing chamber; a plunger having reciprocating movement in line with the longitudinal axis of said chamber, said plunger having a recess adapted to receive one end of a previously pressed carbon stick, the diameter of the carbon stick being less than that of said chamber; means whereby forward movement of said plunger causes the remaining portion of said carbon stick to be moved into said chamber, and causes the plunger to close one end of said chamber; a plunger located at the opposite end of said chamber and having reciprocating movement in line with the longitudinal axis thereof; a magazine for powdered graphite; an intermittently moving carrier having a series of receptacles, any one of said receptacles adapted to receive a measured quantity of graphite from said magazine and move it to rest between the second-named plunger and said chamber; forward movement of said second plunger then causing said powdered graphite to be forced into said chamber, around said carbon stick, and against the end of the first-named plunger, whereby the graphite is pressed to conform to the shape of the chamber, and caused to adhere to said portion of the carbon stick; the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

10. A machine of the character described, comprising a compressing chamber; a plunger having reciprocating movement in line with the longitudinal axis of said chamber, said plunger having a recess adapted to receive one end of a previously pressed carbon stick, the diameter of the carbon stick being less than that of said chamber; means whereby forward movement of said plunger causes the remaining portion of said carbon stick to be moved into said chamber, and causes the plunger to close one end of said chamber; a plunger located at the opposite end of said chamber and having reciprocating movement in line with the longitudinal axis thereof; a magazine for powdered graphite; said magazine having an agitator adapted to keep an amount of graphite equal to the capacity of the magazine in condition for flowing to said receptacles, together with an auxiliary magazine and means for controlling its outlet, whereby a new supply of graphite is fed to the main magazine when the agitated graphite therein has nearly all flowed to said receptacles.

11. A machine of the character described, comprising a compressing chamber; a reciprocating slide having a plunger pivoted thereto, said plunger having a recess formed in the free end thereof; a magazine for previously pressed carbon sticks; mechanism adapted to move one end of one of said sticks into said recess of said plunger; means whereby forward movement of said slide causes said plunger and carbon stick to swing into alinement with the longitudinal axis of said chamber; further forward movement of said slide then causing the remaining portion of said carbon stick to be moved into said chamber, and causing the plunger to close one end of said chamber; a plunger located at the opposite end of said chamber and having reciprocating movement in line with the longitudinal axis thereof; a magazine for powdered graphite; an intermittently moving carrier having a series of receptacles, any one of said receptacles adapted to receive a measured quantity of graphite from said magazine and move it to rest between the second-named plunger and said chamber; forward movement of said second plunger then causing said powdered graphite to be forced into said chamber, around said carbon stick, and against the end of the first-named plunger, whereby the graphite is pressed to conform to the shape of the chamber, and caused to adhere to said portion of the carbon stick; the first-named plunger during return movement thereof being moved away from said pressed graphite and carbon stick; said end of said carbon stick being then left protruding beyond said pressed graphite; further forward movement of the second plunger then causing said pressed graphite and carbon stick to be forced out of said chamber.

Signed at New York city, in the county of New York and State of New York, this 2nd day of October A. D. 1916.

ABRAHAM KIPNISS.
MAX PAUL NEUMANN.